United States Patent
Gasparini et al.

(10) Patent No.: US 7,918,739 B2
(45) Date of Patent: Apr. 5, 2011

(54) TRANSMISSION JOINT

(75) Inventors: Giuseppe Gasparini, Gallarate (IT); Diego Scaltritti, Jerago Con Orago (IT); Andrea Bianchi, Senna Comasco (IT)

(73) Assignee: Agusta S.p.A., Samarate (IT)

( * ) Notice: Subject to any disclaimer, the term of this patent is extended or adjusted under 35 U.S.C. 154(b) by 486 days.

(21) Appl. No.: 12/033,977

(22) Filed: Feb. 20, 2008

(65) Prior Publication Data
US 2008/0214314 A1 Sep. 4, 2008

(30) Foreign Application Priority Data

Feb. 27, 2007 (EP) .................................. 07425103

(51) Int. Cl.
*F16D 3/79* (2006.01)
(52) U.S. Cl. .......................................... 464/98; 464/99
(58) Field of Classification Search .............. 464/92–96, 464/98, 99
See application file for complete search history.

(56) References Cited

U.S. PATENT DOCUMENTS

| | | | | |
|---|---|---|---|---|
| 1,107,916 A | * | 8/1914 | Denis | 464/99 X |
| 3,543,537 A | | 12/1970 | Rothfuss at al. | |
| 4,385,893 A | | 5/1983 | Kirschey | |
| 5,158,504 A | | 10/1992 | Stocco | |

FOREIGN PATENT DOCUMENTS

| | | | |
|---|---|---|---|
| BE | 456920 | 8/1944 | |
| DE | 26 55 178 | 6/1977 | |
| GB | 149693 | 10/1921 | |
| NO | 19313 | * 12/1908 | 464/99 |

* cited by examiner

*Primary Examiner* — Greg Binda
(74) *Attorney, Agent, or Firm* — Berenato & White, LLC

(57) ABSTRACT

A transmission joint for angularly connecting a first and a second member, and having a coupling member interposed functionally between the first and second member and extending about an axis; the coupling member has: a first portion connectable angularly to the first member, a second portion connectable angularly to the second member and located radially outwards of the first portion, and an intermediate portion interposed radially between the first and second portion and elongated in a direction crosswise to the axis; the intermediate portion of the coupling member has, from the first portion to the second portion, a first portion decreasing in thickness crosswise to the direction, and a second portion of constant thickness.

5 Claims, 3 Drawing Sheets

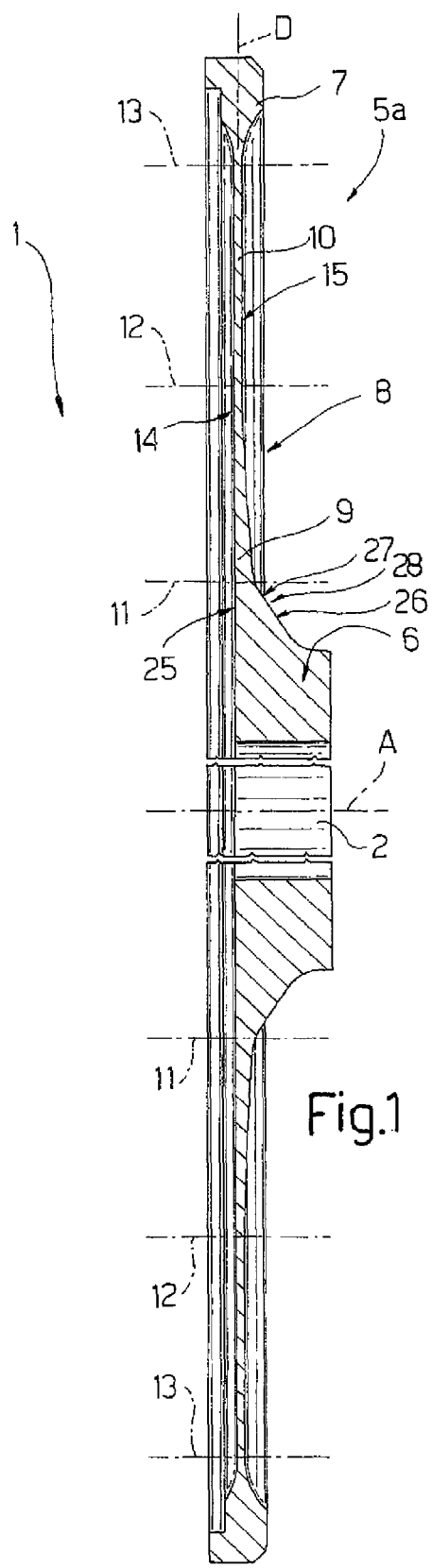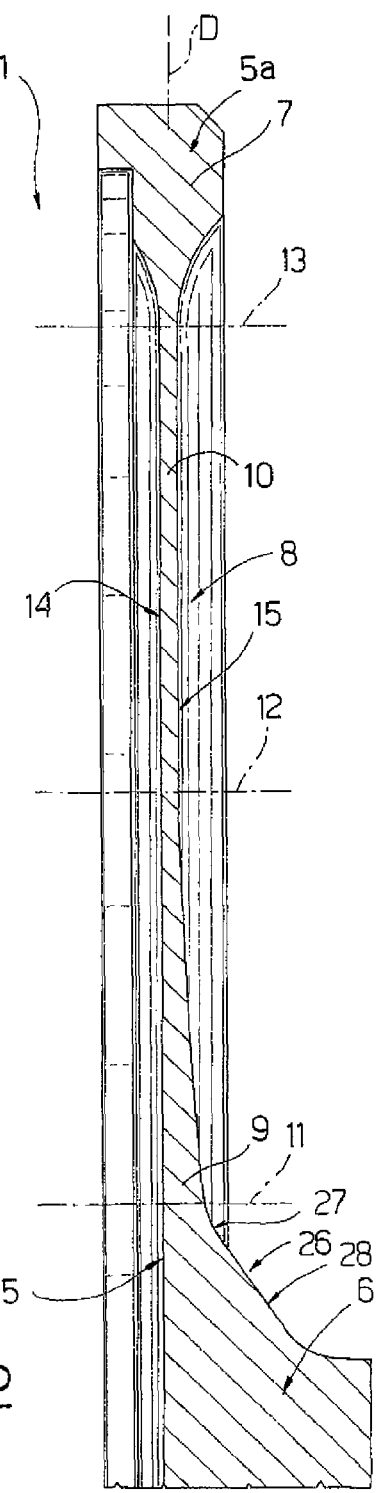
Fig.1
Fig.2

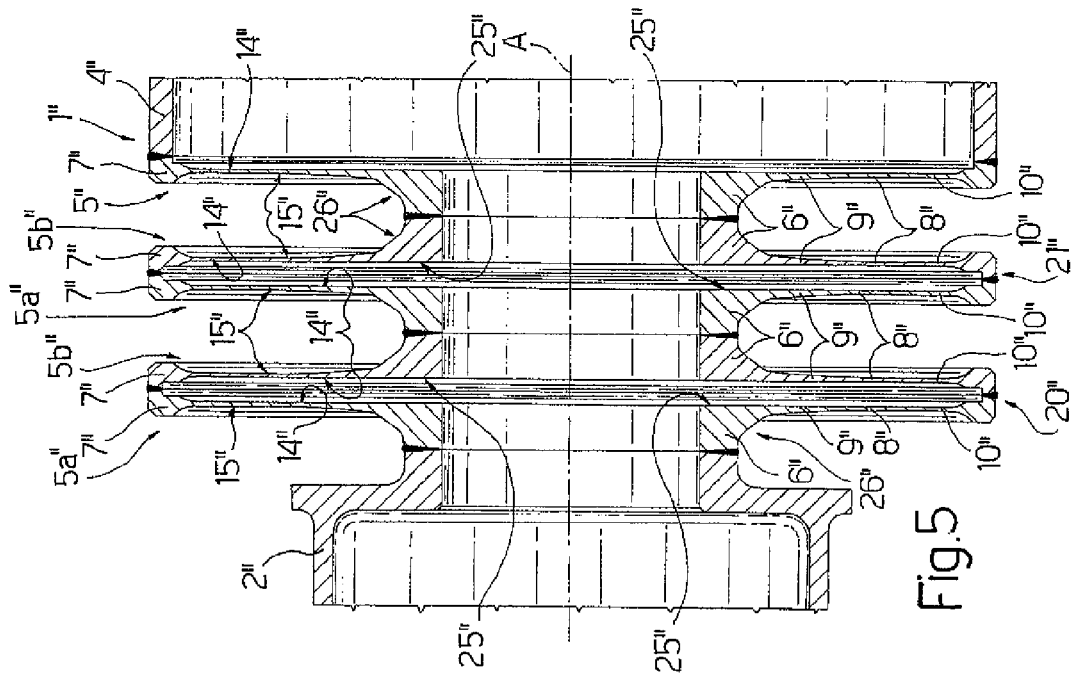
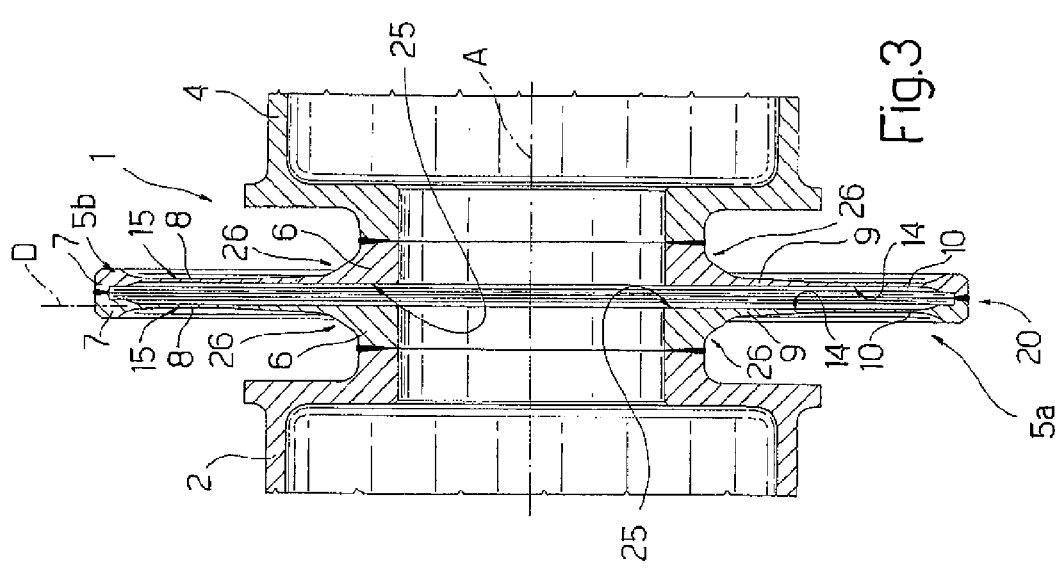

TRANSMISSION JOINT

The present invention relates to a transmission joint, in particular for aircraft application.

BACKGROUND OF THE INVENTION

Transmission joints are used to angularly connect a drive shaft and a driven shaft, and to permit movement and tilt of the shaft axes.

More specifically, transmission joints comprise a tubular coupling member with a hub angularly integral with the drive shaft; and a ring positioned radially outwards of the hub and angularly integral with the driven shaft.

More specifically, the joints may comprise a single coupling member, with the hub and ring connected directly to the drive shaft and driven shaft.

Alternatively, the joints may comprise a number of coupling members angularly integral with one another; in which case, the hub of one of the coupling members is connected to the drive shaft, and the hub of another of the coupling members is connected to the driven shaft.

The coupling member also comprises a thin-walled portion, or so-called diaphragm, interposed radially between the hub and ring and elongated in a direction perpendicular to the drive and driven shaft axes.

Diaphragms are known, for example, as described in Patent BE-456920, in which the profile of the diaphragm comprises, from the hub to the ring, a portion decreasing in thickness and a portion increasing in thickness.

More specifically, the profile is asymmetrical with respect to the extension direction of the diaphragm.

Diaphragms are also known, for example, as described in Patent U.S. Pat. No. 5,158,504, in which the profile is symmetrical with respect to the extension direction of the diaphragm.

More specifically, the profile of these diaphragms comprises, from the hub to the ring, a portion decreasing in thickness and a portion increasing in thickness.

The diaphragm profile of known joints provides, in operating conditions, for transmitting a predetermined torque from the drive shaft to the driven shaft with a wide margin of safety, and for maintaining below a predetermined value the fatigue stress caused by periodic variations in the mutual position of the drive and driven shaft axes.

The known joints are less than satisfactory, on account of the known diaphragm profile failing to minimize the weight and overall size of the joint.

In other words, it possible to improve the diaphragm profile in such a way as to reduce the weight and, hence, overall size of the joint as compared with known solutions, while at the same time maintaining the same margin of safety as regards torque transmission and reduction of fatigue stress caused by periodic variations in the mutual position of the drive and driven shaft axes.

It is also possible, by appropriately designing the diaphragm profile, to reduce the weight and, hence, overall size of the joint, while at the same time reducing buckling phenomena caused when the thin-walled diaphragm is subjected to the twisting moment transmitted by the drive shaft.

Finally, it is possible, by appropriately designing the diaphragm profile, to reduce in-service generation of forced oscillations caused by resonance phenomena between the natural frequencies of the system containing the diaphragm, and the rotation frequencies of the drive or driven shaft.

SUMMARY OF THE INVENTION

It is an object of the present invention to provide a transmission joint which, by appropriate design of the diaphragm profile, is lighter than known joints of the type described above, while at the same time reliably transmitting torque to the driven shaft and allowing misalignment and tilt of the drive and driven shaft axes.

According to the present invention, there is provided a joint as claimed in the attached Claims.

BRIEF DESCRIPTION OF THE DRAWINGS

A preferred, non-limiting embodiment of the present invention will be described by way of example with reference to the accompanying drawings, in which:

FIG. 1 shows an axial section of a coupling member of a transmission joint in accordance with the present invention;

FIG. 2 shows a larger-scale axial half-section, with parts removed for clarity, of a detail of FIG. 1;

FIGS. 3 to 6 show axial sections of respective embodiments of the transmission joint in FIGS. 1 and 2.

DETAILED DESCRIPTION OF THE INVENTION

Figure 6:
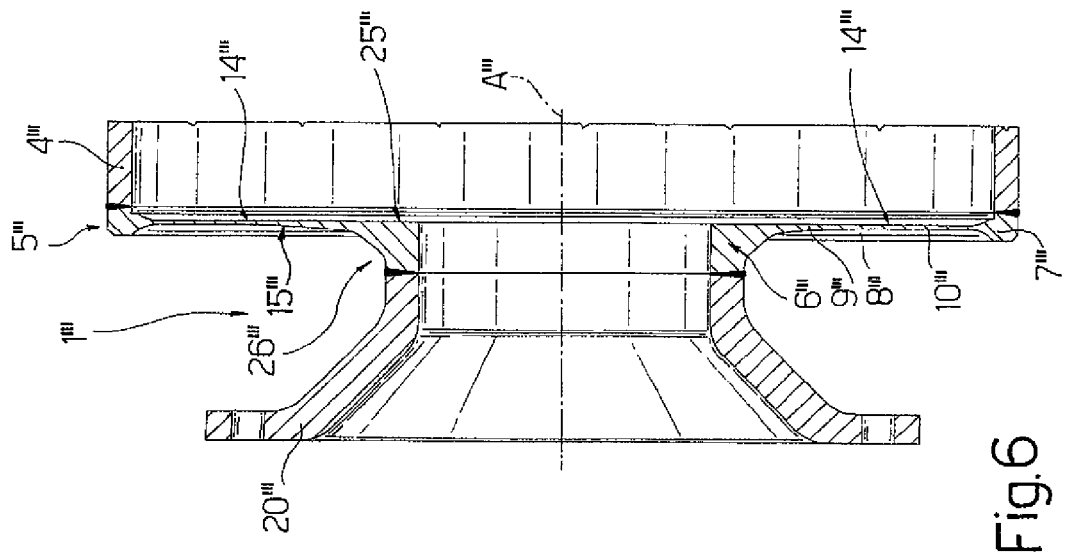

With reference to FIGS. 1 to 3, number 1 indicates a transmission joint for angularly connecting a drive shaft 2, rotating about a respective axis, to a shaft 4 (only shown in FIG. 3) rotating coaxially with shaft 2.

More specifically, transmission joint 1 receives torque from shaft 2, and transmits it to shaft 4.

In addition to transmitting torque from shaft 2 to shaft 4, joint 1 also permits any in-service misalignment and tilt of the axes of shaft 2 and shaft 4.

More specifically, joint 1 comprises a pair 20 (FIG. 3) of coupling members 5a, 5b interposed functionally and axially between shafts 2 and 4.

Each coupling member 5a, 5b is tubular, and extends along an axis A coincident, in use, with the axes of shafts 2 and 4.

Each coupling member 5a, 5b comprises a hub 6 and an annular portion 7, which define an inner radial end and an outer radial end, respectively, of coupling member 5a, 5b.

Hub 6 of coupling member 5a (on the left in FIG. 3) is connected angularly, e.g. by welding or other systems, to shaft 2 to receive motion.

Portions 7 of coupling member 5a and coupling member 5b (on the right in FIG. 3) are connected angularly, e.g. welded, to each other, so that coupling member 5a rotates coupling member 5b.

Hub 6 of coupling member 5b is connected angularly to shaft 4 to transmit rotation of coupling member 5b to shaft 4.

Each coupling member 5a, 5b also comprises a portion—hereinafter referred to as diaphragm 8—interposed radially between relative hub 6 and relative portion 7.

More specifically, diaphragm 8 is thin-walled and elongated in a direction D radial with respect to axis A.

Being much larger radially than axially, diaphragm 8 is in the form of a membrane and therefore highly flexible.

From hub 6 to portion 7, diaphragm 8 advantageously comprises a portion 9 decreasing in thickness crosswise to direction D, and a portion 10 of constant thickness.

More specifically, the size and shape of diaphragm 8 are optimized on the basis of a fatigue calculation method covering the whole volume of the joint.

As shown in FIGS. 1 and 2, portion 9 is bounded radially inwards by an annular section 11 contiguous to hub 6, and radially outwards by an annular section 12.

Portion 10 is bounded radially inwards by section 12, and radially outwards by an annular section 13 contiguous to portion 7.

Diaphragm 8 is bounded laterally by two opposite faces 14, 15.

More specifically, face 14 is flat to simplify machining and quality control.

Adjacent to annular section 13 (FIG. 1), face 14 is connected to a radially inner end of portion 7.

Adjacent to section 11, face 14 is contiguous to a lateral face 25 of hub 6.

More specifically, face 25 is flat and coplanar with face 14.

Face 15 is shaped so that it slopes with respect to and converges with face 14 along portion 9 from section 11 to section 12, and is parallel to face 14 along portion 10.

Adjacent to section 11, face 15 is connected to a face 26, opposite face 25, of hub 6.

More specifically, from section 11 towards axis A, face 26 comprises a portion 27 connected to an inner radial end of face 15; and a flat portion 28 sloping with respect to the plane of face 14.

More specifically, portion 27 is shaped so as to be tangent, at section 11, to the analytic curve defining face 15 at portion 9.

Portion 28 slopes with respect to direction D so that hub 6 increases in thickness from section 11 towards axis A.

Coupling members 5a, 5b are arranged (FIG. 3) with faces 14 facing each other and interposed axially between faces 15.

The material of diaphragm 8 is selected to ensure a predetermined yield and lightness of diaphragm 8.

In actual use, shaft 2 rotates coupling member 5a about axis A; coupling member 5a in turn rotates coupling member 5b; and, finally, coupling member 5b rotates shaft 4 about axis A.

By virtue of their axial and flexural rigidity, coupling members 5a, 5b permit in-service axial misalignment and tilt of the axes of shafts 2 and 4.

Figure 4:
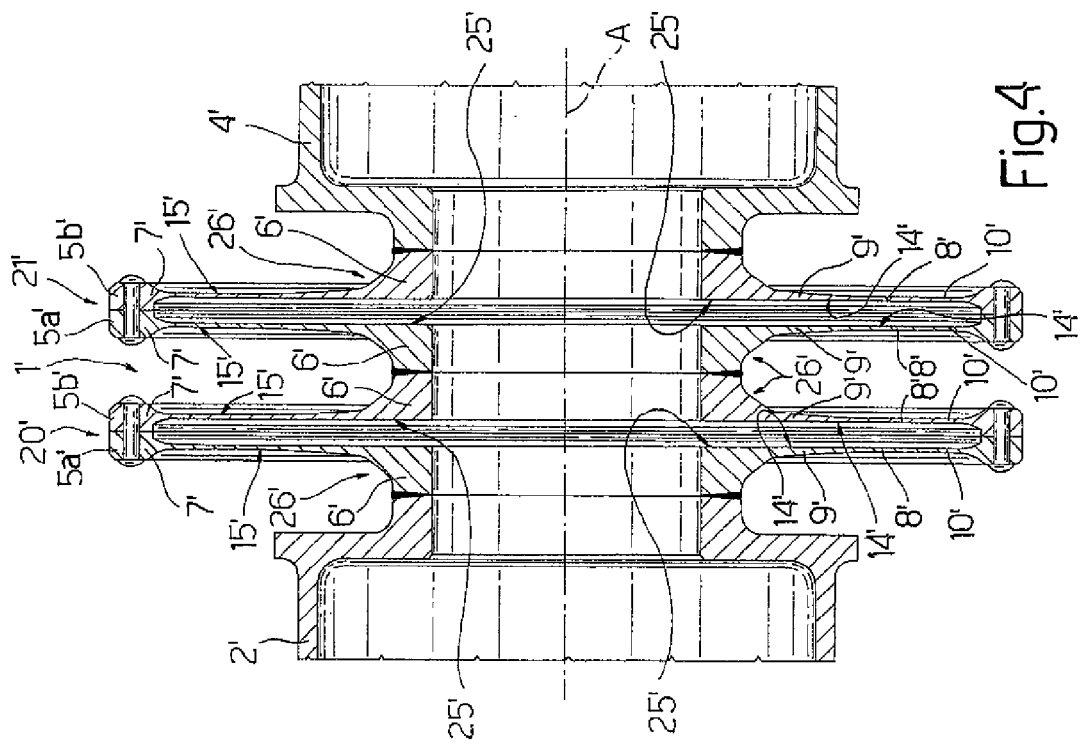

Number 1' in FIG. 4 indicates as a whole a further embodiment of a joint in accordance with the present invention.

Joint 1' is similar to, and only described below insofar as it differs from, joint 1, the corresponding or equivalent parts of joints 1, 1' being indicated, where possible, using the same reference numbers.

Joint 1' differs from joint 1 by comprising two pairs 20', 21' of coupling members 5a', 5b'.

More specifically, one pair 20' (on the left in FIG. 4) of coupling members 5a', 5b' is angularly integral with shaft 2', and the other pair 21' (on the right in FIG. 4) of coupling members 5a', 5b' is angularly integral, on axially opposite sides, with shaft 4' and pair 20' of coupling members 5a', 5b'.

More specifically, hub 61 of coupling member 5a' of pair 20' is welded angularly integral with shaft 2'.

Portions 7' of coupling members 5a', 5b' of pair 20' are riveted angularly integral with each other.

Hub 6' of coupling member 5b' of pair 20' is welded angularly integral with hub 6' of coupling member 5a' of pair 21'.

Portions 7' of coupling members 5a', 5b' of pair 21' are riveted angularly integral with each other.

Hub 6' of coupling member 5b' of pair 21' is welded angularly integral with shaft 4'.

Number 1" in FIG. 5 indicates as a whole a third embodiment of a joint in accordance with the present invention.

Joint 1" is similar to joints 1, 1', and only described below insofar as it differs from joint 1', the corresponding or equivalent parts of joints 1, 1', 1" being indicated, where possible, using the same reference numbers.

More specifically, joint 1" differs from joint 1' by coupling member 5b" of pair 21" not being connected directly to shaft 4".

In this case, coupling member 5b" of pair 21" is welded angularly to a further coupling member 5", in turn welded angularly to shaft 4".

More specifically, hub 6" of further coupling member 5" is connected angularly to hub 6" of coupling member 5b" of pair 21", and portion 7" of further coupling member 5" is connected angularly to shaft 4".

Number 1'" in FIG. 6 indicates as a whole a fourth embodiment of a joint in accordance with the present invention.

Joint 1'" is similar to, and only described below insofar as it differs from, joints 1, 1', 1", the corresponding or equivalent parts of joints 1, 1', 1", 1'" being indicated, where possible, using the same reference numbers.

Joint 1'" differs from joints 1, 1', 1" by comprising a single coupling member 5'". Portion 7'" of coupling member 5'" is welded angularly integral with shaft 4'", and hub 6'" of coupling member 5'" is angularly integral with the drive shaft (not shown) by means of a weld and a flange 20'".

Operation of joints 11, 1", 1'" is identical to that of joint 1, and therefore not described.

The advantages of transmission joint 1, 1', 1", 1'" according to the present invention will be clear from the foregoing description.

In particular, the Applicant has found that joint 1, 1', 1", 1'", by virtue of the design of the profile of diaphragm 8, 8', 8", 8'", provides for minimizing the weight and, hence, overall size of joint 1, 1', 1", 1'", while at the same time ensuring reliable torque transmission between shafts 2, 4; 2', 4'; 2", 4"; and between flange 20'" and shaft 4'".

The Applicant has also found that joint 1, 1', 1", 1'", by virtue of the design of diaphragm 8, 8', 8", S'", provides for maintaining sufficient axial and flexural rigidity to ensure fatigue stress caused by misalignment and tilt of the axes of shaft 2, 2', 2" and shaft 4, 4', 4" is maintained below a predetermined value.

The design of diaphragm 8, 8', 8", 8'" also provides for reducing buckling and resonance phenomena generated during operation of joint 1, 1', 1", 1'".

The design of diaphragm 8, 8', 8", 8'" can also be adapted easily to different operating requirements of joint 1, 1', 1", 1'".

In fact, for each load configuration on diaphragm 8, 8', 8", 8'", it is possible to determine an optimum location of sections 11 and 12 with respect to axis A, and an optimum thickness pattern of portion 9, 9', 9", 9'" alongside an increase in the distance from axis A.

Another advantage of the present invention lies in the flat shape of face 14, 14', 14", 14'", which provides for easy machining and dimensional control of the face.

Clearly, changes may be made to joint 1, 1', 1", 1'" as described and illustrated herein without, however, departing from the scope defined in the accompanying Claims.

In particular, joint 1, 1', 1", 1'" may comprise a single coupling member 5a, 5b; 5a', 5b'; 5a", 5b"; 5'"; with the hub 6, 6', 6", 6'" connected directly to shaft 2, 2', 2", and portion 7, 7', 7", 7'" connected directly to shaft 4, 4', 4", 4'".

The invention claimed is:

1. A transmission joint (1, 1', 1", 1'") for angularly connecting a first member (2, 2', 2") and a second member (4, 4', 4", 4'"), and comprising at least one coupling member (5a, 5b; 5a', 5b'; 5a", 5b"; 5'") interposed functionally between said first and second members (2, 2', 2"; 4, 4', 4", 4'") and extending about an axis (A); said coupling member (5a, 5b; 5a', 5b'; 5a", 5b"; 5'") comprising:

a first portion (6, 6', 6", 6'") connectable angularly to said first member (2, 2', 2");

a second portion (7, 7', 7", 7''') connectable angularly to said second member (4, 4', 4", 4''') and located radially outwards of said first portion (6, 6', 6", 6'''); and an intermediate portion (8, 8', 8", 8''') interposed radially between said first and second portions (6, 6', 6", 6'''; 7, 7', 7", 7''') and elongated in a direction (D) crosswise to said axis (A);

said intermediate portion (8, 8', 8", 8''') of said coupling member (5a, 5b; 5a', 5b'; 5a", 5b"; 5''') comprising, from said first portion (6, 6', 6", 6''') to said second portion (7, 7', 7", 7'''), a first portion (9, 9', 9", 9''') decreasing in thickness crosswise to said direction (D), and a second portion (10, 10', 10", 10''') of constant thickness;

said intermediate portion (8, 8', 8", 8''') further comprising a flat lateral first face (14, 14', 14", 14''') and a lateral second face (15, 15', 15", 15''') opposite said first face (14, 14', 14", 14''') and connected, at opposite radial ends, to said first and second portion (6, 6', 6", 6'''; 7, 7', 7", 7''');

said first portion (6, 6', 6", 6''') being bounded laterally, at least at a respective outer radial end (11), by a first surface (25, 25', 25", 25''') contiguous to and coplanar with said first face (14, 14', 14", 14''') of said intermediate portion (8, 8', 8", 8''');

said first portion (6, 6', 6", 6''') being bounded laterally, on the opposite side to said first surface (25, 25', 25", 25'''), by a second surface (26) which, from said outer radial end (11) towards said axis (A), comprises a first region (27) connected to said second face (15, 15', 15", 15''') of said intermediate portion (8, 8', 8", 8'''), and a flat second region (28) sloping with respect to said second face (15, 15', 15", 15''');

said second region (28) sloping away from said first surface (25, 25', 25", 25''') from said outer radial end (11) towards said axis (A).

2. The transmission joint as claimed in claim 1, wherein said first region (27) is shaped so as to be tangent, at a respective radially outer end section (11), to an analytic curve defining said second face (15, 15', 15", 15''').

3. The transmission joint as claimed in claim 1, wherein said intermediate portion (8, 8', 8", 8''') is in the form of a membrane.

4. The transmission joint as claimed in claim 1, comprising at least one pair (20; 20', 21'; 20", 21") of said coupling members (5a, 5b; 5a', 5b'; 5a", 5b"); wherein said second portions (7, 7', 7") of said coupling members (5a, 5b; 5a', 5b'; 5a", 5b") in said pair (20; 20', 21'; 20", 21") are angularly connected to each other; said first portion (6, 6', 6") of one of said coupling members (5a, 5b; 5a', 5b'; 5a", 5b") being connectable angularly to said first member (2, 2', 2"); and said first portion (6, 6', 6") of the other of said coupling members (5a, 5b; 5a', 5b'; 5a", 5b") being connectable angularly to said second member (4, 4', 4").

5. The transmission joint as claimed in claim 4, wherein said coupling members (5a, 5b; 5a', 5b'; 5a", 5b") are positioned with said first faces (14, 14', 14") facing each other and interposed axially between said second faces (15, 15', 15").

\* \* \* \* \*